United States Patent
Yu et al.

(10) Patent No.: US 12,417,528 B2
(45) Date of Patent: Sep. 16, 2025

(54) METHOD AND DEVICE FOR TESTING PRODUCT QUALITY

(71) Applicant: GOERTEK INC., Shandong (CN)

(72) Inventors: Yangyang Yu, Shandong (CN); Shiyu Li, Shandong (CN)

(73) Assignee: GOERTEK INC., Shandong (CN)

( * ) Notice: Subject to any disclaimer, the term of this patent is extended or adjusted under 35 U.S.C. 154(b) by 518 days.

(21) Appl. No.: 17/758,788

(22) PCT Filed: Nov. 18, 2020

(86) PCT No.: PCT/CN2020/129592
§ 371 (c)(1),
(2) Date: Jul. 13, 2022

(87) PCT Pub. No.: WO2021/143343
PCT Pub. Date: Jul. 22, 2021

(65) Prior Publication Data
US 2023/0039805 A1 Feb. 9, 2023

(30) Foreign Application Priority Data
Jan. 15, 2020 (CN) .......................... 202010044767.X (51) Int. Cl.
*G06T 7/00* (2017.01)
*G06T 7/62* (2017.01)
(Continued)

(52) U.S. Cl.
CPC .............. *G06T 7/0008* (2013.01); *G06T 7/62* (2017.01); *G06V 10/25* (2022.01); *G06V 10/44* (2022.01);
(Continued)

(58) Field of Classification Search
None
See application file for complete search history.

(56) References Cited

U.S. PATENT DOCUMENTS 10,818,004 B2 * 10/2020 Iwanaga .................... G06T 7/66
11,017,259 B2 * 5/2021 Ambikapathi ......... G06V 10/44
(Continued)

FOREIGN PATENT DOCUMENTS

CN 107451997 A 12/2017
CN 107679490 A 2/2018
(Continued)

*Primary Examiner* — Anand P Bhatnagar
(74) *Attorney, Agent, or Firm* — LKGlobal | Lorenz & Kopf, LLP (57) ABSTRACT

A method and device for testing product quality are disclosed. The method for testing product quality comprises: acquiring an image of a product to be tested; testing the image by using a pre-trained neural network model to obtain a testing result output by the neural network model; when the testing result indicates that the product to be tested is a defective product, performing a secondary judgment on the testing result according to position information of defective feature pixels in the image in the testing result, and determining whether the product to be tested is qualified according to a secondary judgment result. The method has high test accuracy, ensures the quality of product and facilitates reducing the labor cost of test.

7 Claims, 5 Drawing Sheets

(51) Int. Cl.
*G06V 10/25* (2022.01)
*G06V 10/44* (2022.01)
*G06V 10/75* (2022.01)
*G06V 10/82* (2022.01)

(52) U.S. Cl.
CPC ............ *G06V 10/751* (2022.01); *G06V 10/82* (2022.01); *G06T 2207/10144* (2013.01); *G06T 2207/20081* (2013.01)

(56) References Cited

U.S. PATENT DOCUMENTS

| | | | |
|---|---|---|---|
| 11,099,158 B2 * | 8/2021 | Lin | G01S 7/521 |
| 11,144,814 B2 * | 10/2021 | Cha | G06T 7/001 |
| 11,609,187 B2 * | 3/2023 | Tsai | G06N 3/08 |
| 2018/0322623 A1 * | 11/2018 | Memo | G06N 3/084 |
| 2019/0220972 A1 | 7/2019 | Iwanaga | |
| 2019/0318471 A1 | 10/2019 | Chen et al. | |
| 2020/0005070 A1 * | 1/2020 | Ambikapathi | G06F 18/2413 |
| 2020/0175352 A1 * | 6/2020 | Cha | G06N 3/04 |
| 2020/0191954 A1 * | 6/2020 | Lin | G01N 29/04 |
| 2020/0364889 A1 * | 11/2020 | Tsai | G01N 21/3581 |
| 2020/0364906 A1 * | 11/2020 | Shimodaira | G06V 10/82 |
| 2022/0254030 A1 * | 8/2022 | Cha | G06T 7/11 |

FOREIGN PATENT DOCUMENTS

| | | | | |
|---|---|---|---|---|
| CN | 108562589 | A | 9/2018 | |
| CN | 108776966 | A | 11/2018 | |
| CN | 108982514 | | * 12/2018 | ............. G01N 21/88 |
| CN | 108982514 | A | 12/2018 | |
| CN | 109406533 | A | 3/2019 | |
| CN | 109583465 | A | 4/2019 | |
| CN | 109741296 | A | 5/2019 | |
| CN | 110018166 | A | 7/2019 | |
| CN | 110378900 | A | 10/2019 | |
| CN | 110403232 | A | 11/2019 | |
| CN | 110458814 | A | 11/2019 | |
| CN | 113834450 | A | 12/2021 | |
| JP | 2007093330 | A | 4/2007 | |
| WO | 2017194276 | A1 | 11/2017 | |
| WO | 2019194064 | A1 | 10/2019 | |
| WO | 2019233166 | A1 | 12/2019 | |

* cited by examiner

METHOD AND DEVICE FOR TESTING PRODUCT QUALITY

CROSS-REFERENCE TO RELATED APPLICATION

This Application is a U.S. National Stage entry under 35 U.S.C. § 371 based on International Application No. PCT/CN2020/129592, filed on Nov. 18, 2020, which was published under PCT Article 21(2) and which claims priority from the Chinese patent application No. 202010044767.X filed with the China Patent Office on Jan. 15, 2020 and entitled "Method and Device for Testing Product Quality", which are all hereby incorporated herein in their entirety by reference.

TECHNICAL FIELD

This Application pertains to the technical field of test, in particular to a method and device for testing product quality.

BACKGROUND

The quality of the magnetic circuit, which is a component of the loudspeaker in computer, communication and consumer electronic products, directly affects the acoustic performance of the loudspeaker. Defects such as cracks, dirt and impurities may appear on the surface of the magnetic circuit, and are conventionally judged by manual test. The cost of manual test is high; moreover, the product yield is low due to factors such as fatigue and limitations of human eyes. In addition, other objects, desirable features and characteristics will become apparent from the subsequent summary and detailed description, and the appended claims, taken in conjunction with the accompanying drawings and this background.

SUMMARY

In view of the above problems, the present disclosure is proposed to provide a method and device for testing product quality that solves or at least partially solves the above problems, which has good testing effect and saves the labor cost.

According to an aspect of the present disclosure, there is provided a method for testing product quality, comprising:
acquiring an image of a product to be tested;
testing the image by using a pre-trained neural network model to obtain a testing result output by the neural network model; and
when the testing result indicates that the product to be tested is a defective product, performing a secondary judgment on the testing result according to position information of defective feature pixels in the image in the testing result, and determining whether the product to be tested is qualified according to a secondary judgment result.

According to another aspect of the present disclosure, there is provided a device for testing product quality, comprising:
an image acquisition module which acquires an image of a product to be tested;
a testing module which tests the image by using a pre-trained neural network model to obtain a testing result output by the neural network model; and
a secondary judgement module which, when the testing result indicates that the product to be tested is a defective product, performs a re-judging on the testing result according to position information of defective feature pixels in the image in the testing result, and determines whether the product to be tested is qualified according to a re-judging result.

According to yet another aspect of the present disclosure, there is provided a computer-readable storage medium storing computer instructions that cause the computer to execute the above method.

The technical solutions of the present disclosure, by acquiring the image of the product to be tested, using the neural network model to test the image, and obtaining the testing result output by the neural network model, can effectively identify the defective feature in the product, avoid missing test, have good testing effect and stable performance, and have the beneficial effect of replacing manual testing and saving labor cost. Moreover, by adopting the secondary judgment mechanism to perform secondary judgment on the product to be tested whose testing result indicates that it is a defective product, it can be avoided misjudging a qualified product as a defective product, thereby improving the test accuracy and ensuring the product quality.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Exemplary embodiments of the present disclosure will be described in more detail below with reference to the accompanying drawings. Although exemplary embodiments of the present disclosure are shown in the accompanying drawings, it should be understood that the present disclosure may be implemented in various forms and should not be limited by the embodiments set forth herein. On the contrary, these embodiments are provided so that the present disclosure can be more thoroughly understood and the scope of the present disclosure can be fully communicated to those skilled in the art.

Most of the production lines that need to test the quality of product (such as appearance and state) still rely on manual test. The obvious problems of manual test include high labor cost and unstable testing result. There is also visual test based on CCD (charge coupled device), but since there are many types of defective states in the image and the image displaying the defective feature is unclear, the traditional visual test has poor effect and robustness. With respect to this, the present disclosure proposes a product quality testing solution, which tests the product quality based on deep learning and performs a secondary judgment on the testing result, thereby improving the robustness of the test, ensuring the accuracy, and facilitating the replacement of manual test with testing by machines and reduction of labor cost.

Figure 1:
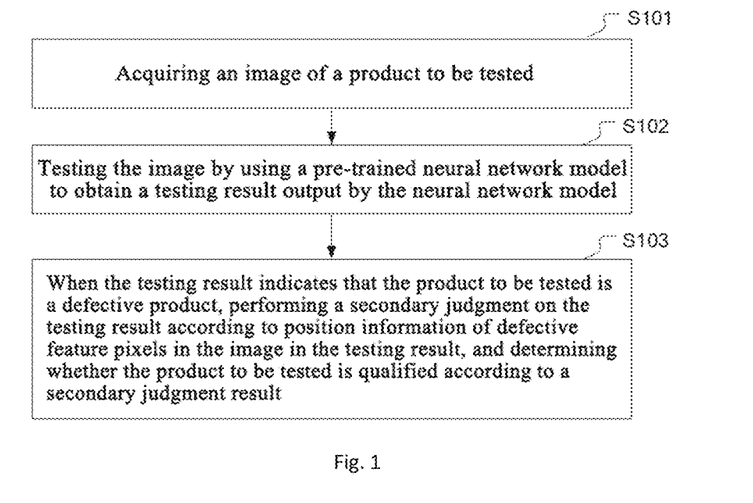
FIG. 1 is a schematic flowchart of a method for testing product quality according to an embodiment of the present disclosure.

FIG. 1 is a schematic flowchart of a method for testing product quality according to an embodiment of the present disclosure. Referring to FIG. 1, the method for testing product quality of this embodiment comprises the following steps:

Step S101: acquiring an image of a product to be tested. The product to be tested is not specifically limited in this embodiment, and any product with testing needs can use the method of this embodiment.

Step S102: testing the image by using a pre-trained neural network model to obtain a testing result output by the neural network model. In practical application, samples of defective products are collected before testing to train the neural network model, and the neural network model is used for intelligent testing of product quality, which makes the test performance more stable and reliable.

Step S103: when the testing result indicates that the product to be tested is a defective product, performing a secondary judgment on the testing result according to position information of defective feature pixels in the image in the testing result, and determining whether the product to be tested is qualified according to a secondary judgment result. The defective feature pixels herein refer to pixels indicating a defective feature of the product. The defective feature of the product is a concept in contrast to a normal product feature. The defective feature of the product is the defect of the product. When the product has a defect, the pixels at positions corresponding to the defect are obviously different from the pixels at positions corresponding to a non-defect on the product image, so the defective feature pixels can be determined.

As shown in FIG. 1, the method for testing product quality of this embodiment solves the technical problems of low manual test efficiency, missing test, unstable performance and high labor cost by using the neural network model in product quality testing. Furthermore, by performing a secondary judgment on the testing result of the neural network model according to position information of defective feature pixels in the image, it effectively avoids the problem of misjudgment, improves the test accuracy and ensures the test effect.

In the actual product production process, the product quality will not be perfect, and there is an allowable error range. When the neural network model is used to test, it is inclined to identify the product whose defective feature area is less than an area threshold as a defective product, resulting in a high misjudgment rate. With respect to this, in an embodiment, the step of performing a secondary judgment on the testing result according to position information of defective feature pixels in the image in the testing result comprises: obtaining a contour of the defective feature pixels according to information of an effective region in the testing result, wherein the effective region is an image region including the defective feature pixels; calculating an area value of the contour according to the pixels included in the figure of the contour, and maintaining the testing result of defective product when the area value is greater than a preset area threshold; and when the area value is less than or equal to the preset area threshold, judging the product to be tested as a qualified product.

That is to say, if an image of a product to be tested is input into the neural network model, and the product to be tested is determined as a defective product after determining by the neural network model, in this embodiment, the contour of the defective feature pixels, such as the circumscribed rectangle or irregular polygon of the region including the defective feature pixels, is obtained according to the effective region information (the effective region is the image region including the defective feature pixels) contained in the testing result output from the neural network model. The area value of the contour is calculated based on the contour (the area is determined by the number of pixels included inside the figure of the contour). When the area value is greater than the preset area threshold, it is determined that the defective feature is a real defective feature. When the area is less than or equal to the preset area threshold, it is determined that the defective feature is not a real defective feature, and the testing result ("a defective product") output from the neural network model is amended to "a qualified product", and the final testing result of the product to be tested is determined as "a qualified product".

Further, in this embodiment, acquiring the image of the product to be tested comprises: acquiring a first image and a second image of the product to be tested under different exposure duration of a camera (such as a CCD camera) respectively, wherein the exposure duration corresponding to the first image is less than the exposure duration corresponding to the second image. The step of testing the image by using a pre-trained neural network model to obtain a testing result output by the neural network model comprises: testing the first image and the second image respectively by using the pre-trained neural network model; and when at least one of the first image and the second image includes a defective feature, obtaining a testing result that the product to be tested is a defective product.

If the exposure durations are different (the specific exposure duration can be set according to the demand), the image color obtained will be different, and the image information reflected by the images of different colors is also different accordingly. Taking the testing of wool/fiber and breakage in the product as an example, the wool/fiber is difficult to display in the long exposure image, while the contour and color of breakage can be displayed clearly only in the long exposure image. Based on this, in this embodiment, images with different exposure durations of the same product are obtained, and then the images with different exposure durations are tested by using the pre-trained neural network model, and the testing results are obtained.

In order to improve the test efficiency and accuracy, in this embodiment, the neural network model is trained before using the pre-trained neural network model to test the image, specifically, it comprises: acquiring a first image and a second image of the defective product, and marking an effective region where a defective feature is located on the first image and the second image of the defective product respectively, wherein at least part of defective features contained in the first image and the second image are different, and the effective region includes defective feature pixels; obtaining a first training sample according to the first image of the defective product, information of the effective region and defect category information corresponding to the defective feature, and training a first neural network model by using the first training sample to obtain a stable first neural network model which can correctly identify the defective feature in the first image; and obtaining a second training sample according to the second image of the defective product, information of the effective region and defect category information corresponding to the defective feature, and training a second neural network model by using the second training sample to obtain a stable second neural network model which can correctly identify the defective feature in the second image. The exposure durations of the first image and the second image are different.

In this embodiment, two types of images are obtained, and different neural network models are trained for different types of images, respectively. It is understandable that for scenes where only one type of image needs to be obtained, only one corresponding neural network model needs to be trained.

After obtaining the stable first neural network and the stable second neural network model, the first image of the product to be tested is tested by using the first neural network model. When it is found that the first image of the product to be tested includes more than two defect categories, the defect category is arranged in a preset order according to position information of each defect category appearing in the first image of the product to be tested, and a defect category is determined as a representative defect category included in the first image according to an arrangement result. The second neural network model is used to test the second image of the product to be tested, when it is found that the second image of the product to be tested includes more than two defect categories, the defect category is arranged in a preset order according to position information of each defect category appearing in the second image of the product to be tested, and a defect category is determined as a representative defect category included in the second image according to an arrangement result. The representative defect category included in the first image or the representative defect category included in the second image is taken as the defect category of the product to be tested, so as to classify the product to be tested according to the defect category of the product to be tested.

Generally, the purpose of product quality testing is to find defective products, separate defective products from qualified products, and deal with defective products by classification. In actual production, the products to be tested may have more than one type of defects, so it is necessary to consider the classification and treatment of these defective products. For example, the statistics of defective categories provide decision-making reference for subsequent production improvement.

This embodiment provides a solution for classifying the defective products obtained by testing. For example, with respect to the first image and the second image of the same product, the representative defect categories included in the first image and the second image are determined respectively, either of the representative defect categories of the two images is selected as the defect category of the product to be tested, and the count value of the number of defective products corresponding to the defect category of the product to be tested is added by 1.

It should be noted that in practical application, the priority of the representative defect category of the first image and the second image may be set according to the demand, and the representative defect category of the image with the higher priority is taken as the defect category of the product. For example, the priority of the representative defect category of the first image is set as level 1, and the priority of the representative defect category of the second image is set as level 2. The priority of level 1 is higher than level 2. Accordingly, after determining the representative defect categories included in the first image and the second image, the representative defect category of the first image is taken as the defect category of the product. Optionally, a priority is directly set for each defect category, and the representative defect category with the higher priority is taken as the defect category of the product to be tested. Of course, if there is no priority in the engineering level and all defects are considered equally important, any one of the defects can be selected as the defect category of the product.

In practical application, besides the above allowable errors that may affect the product quality testing result, the position of the defective feature may also affect the product quality testing result. For example, as far as the crush defect is concerned, the crush defect in the center of the hard material product belongs to the category of "fatal" defect, while the crush defect at the edge of the hard material product (for example, on the rubber corner protector) may belong to the category of allowable defect because the crush may be recovered. In sum, the position of defective feature on the product may affect the classification of defect, and further affect the testing result of product.

For this reason, in this embodiment, when performing a secondary judgment of the testing result according to the position information of the defective feature pixels in the image in the testing result, the position of the defective feature on the product is considered. Specifically, it comprises: dividing the image into a target region and a non-target region according to a relationship between positions of defective features and product quality, wherein the target region refers to a region in the image where occurrence of defective feature affects the product quality, and the non-target region refers to a region in the image where occurrence of defective feature does not affect the product quality; according to the position information of the defective feature pixels in the image in the testing result, matching positions of the defective feature pixels in the image with the target region and the non-target region respectively; when the positions of the defective feature pixels in the image is successfully matched with the target region, maintaining the testing result of defective product; and when the position of the defective feature pixels in the image is successfully matched with the non-target region, determining the product to be tested as a qualified product.

In addition, in order to further improve the test accuracy, the testing result output by the neural network model of this embodiment further includes defect category information and confidence corresponding to the defect category when the product to be tested is a defective product. The step of performing a secondary judgment on the testing result according to position information of defective feature pixels in the image in the testing result comprises: setting a defect threshold corresponding to the target area; and comparing the confidence corresponding to the defect category with the defect threshold, and maintaining the testing result of defective product when the confidence of the defect category is greater than the preset defect threshold.

Thus, by performing defective feature identification with respect to two images of the product to be tested respectively, the defective feature in the product can be effectively identified, thereby avoiding missed test, improving the test effect, and facilitating replacing manual test and saving costs. The secondary judgment is performed on the testing result to avoid misjudging a qualified product as a defective product and ensure the accuracy of the test.

The magnetic circuit is a component of speakers in computer, communication and consumer electronics products. The quality of magnetic circuit directly affects the acoustic performance of speakers. Moreover, the magnetic circuit test faces many problems, such as multiple defect categories and low test efficiency and accuracy. In the following embodiment, the product quality testing method is illustrated by taking the magnetic circuit product as an example of the product to be tested.

Figure 2:
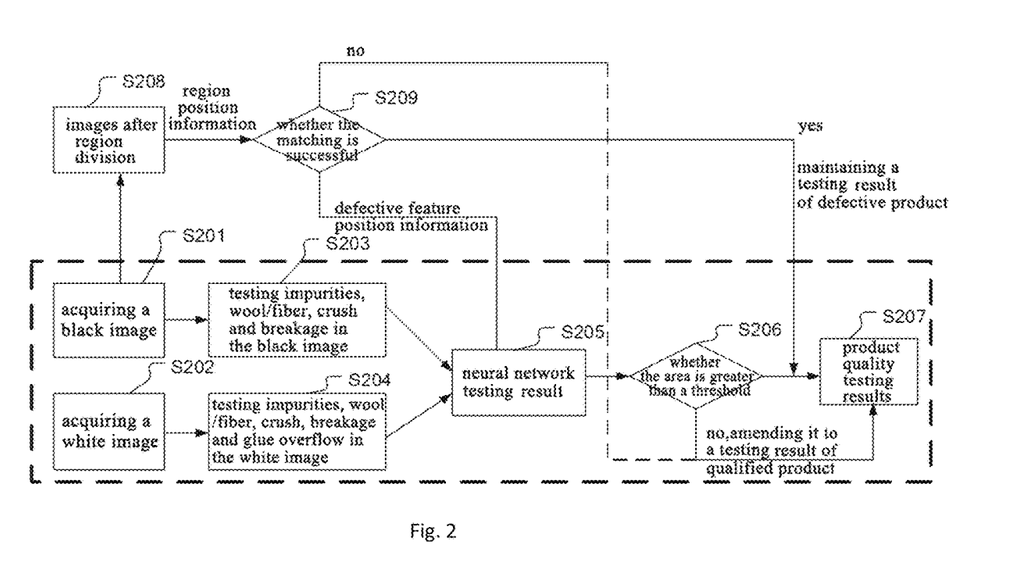
FIG. 2 is a schematic flowchart of a method for testing magnetic circuit product quality according to an embodiment of the present disclosure.

FIG. 2 is a schematic flowchart of a magnetic circuit product quality testing method according to an embodiment of the present disclosure. Referring to FIG. 2, the magnetic circuit product quality testing method of this embodiment comprises the following steps.

A variety of defects may appear on a magnetic circuit product of this embodiment. For example, the product defects are divided into impurities, wool/fiber, crush and breakage. The wool/fiber is difficult to display in a long exposure image, so the image with short exposure duration is used. Herein, the image with short exposure duration is called black image since a small amount of light entered. The contour and color of other three types of defects, i.e., impurities, crush and breakage, can be displayed clearly only in an image with long exposure duration, so the image with long exposure duration is used. The image with long exposure duration is called white image since a large amount of light entered. All defects of the magnetic circuit products can be clearly displayed by the above two images.

Step S201, acquiring a black image.

Figure 5:
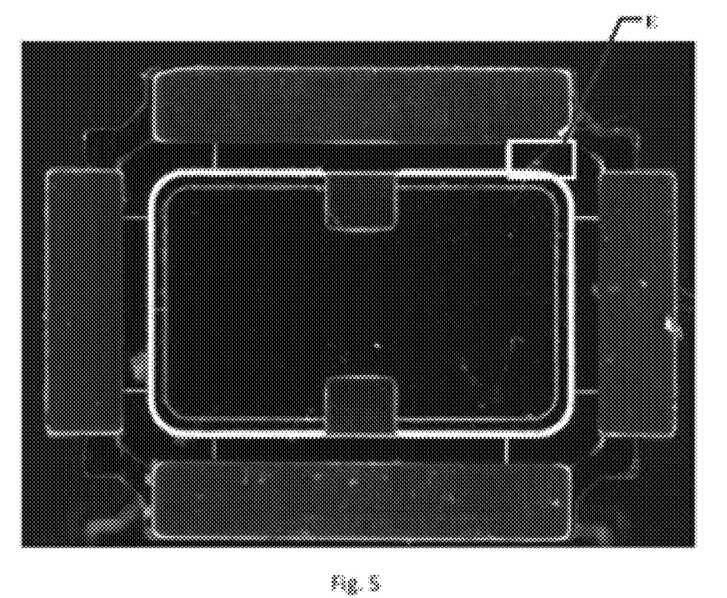
FIG. 5 is a schematic diagram of a type of defect included in the black image of a magnetic circuit product according to an embodiment of the present disclosure.

FIG. 5 shows a black image obtained in this embodiment. FIG. 5 schematically shows a type of defect in the black image of a magnetic circuit product. In FIG. 5, the small rectangular region at the upper right shown by the reference mark E clearly shows that there is a wool/fiber on the magnetic circuit product.

Step S202: acquiring a white image.

Figure 3:
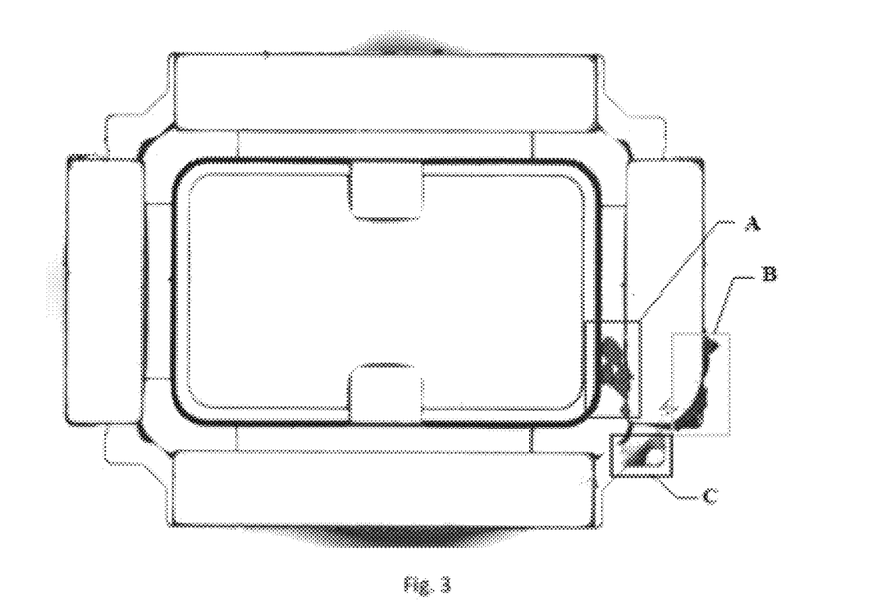
FIG. 3 is a schematic diagram of three types of defects included in a white image of the magnetic circuit product according to an embodiment of the present disclosure.
Figure 4:
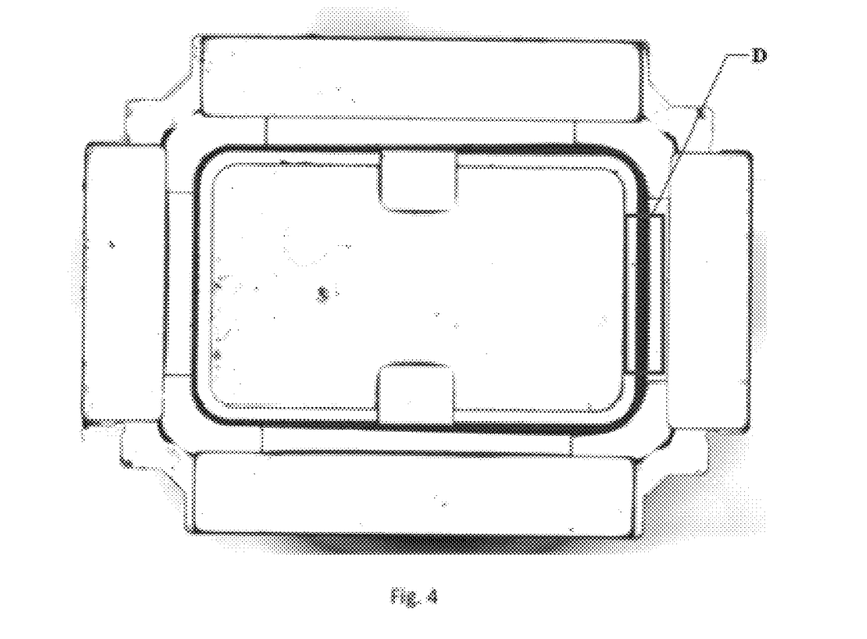
FIG. 4 is a schematic diagram of a type of defect included in a white image of a magnetic circuit product according to an embodiment of the present disclosure.

FIG. 3 and FIG. 4 show a white image obtained in this embodiment. FIG. 3 schematically shows three types of defects in the white image of a magnetic circuit product. In FIG. 3, the rectangular region shown by reference mark A clearly shows that the magnetic circuit product contains impurities, the rectangular region shown by reference mark B clearly shows that the magnetic circuit product contains breakage, and the rectangular region shown by reference mark C clearly shows that the magnetic circuit product is crushed.

FIG. 4 schematically shows a type of defect in the white image of a magnetic circuit product. The rectangular region shown by reference mark D clearly shows that the magnetic circuit product has a defect of glue overflow.

Step S203: testing impurities, wool/fiber, crush and breakage in the black image.

The neural network model is used to test the black image. In other words, the pre-trained neural network model is used to test the image and obtain the testing result output by the neural network model. For example, the pre-trained neural network model is used to test the black image and obtain the testing result output by the neural network model that the black image includes at least one of the following defect categories: impurities, wool/fiber, crush and breakage. As to the training process of the neural network model, please refer to the description of the above method embodiment, which will not be repeated here. The types and number of defects included in the black image are not limited herein. For example, in an embodiment, there may be one type of the defect selected from impurities, wool/fiber, crush, etc. in the black image; in another embodiment, there may be two or more types of defects selected from impurities, wool/fiber, crush, and breakage in the black image. It should be determined according to the actual situation.

Step S204: testing impurities, wool/fiber, crush, breakage and glue overflow in the white image.

In this step, the neural network model is used to test the white image. In other words, the pre-trained neural network model is used to test the white image and obtain the testing result output by the neural network model that the white image includes at least one of the following defect categories: impurities, wool/fiber, crush, breakage and glue overflow. The types and number of defects included in the white image are not limited herein. For example, in an embodiment, there may be one type of the defect selected from impurities, wool/fiber, crush, breakage and glue overflow in the white image; in another embodiment, there may be two or more types of defects selected from impurities, wool/fiber, crush, and breakage in the white image.

Step S205, obtaining neural network testing result.

According to step S203 and step S204, testing results corresponding to different images can be obtained. If a defective feature is identified in both the black image and the white image, the magnetic circuit product to be tested is determined as a defective product; if a defective feature is identified in one of the black image and the white image, the magnetic circuit product to be tested will be determined as a defective product; only when no defective feature is tested in both the black image and the white image, the magnetic circuit product to be tested will be determined as a qualified product, thereby ensuring the test accuracy. That is, if the testing result of the black image is inconsistent with that of the white image, then according to the principle that it is determined as a defective product as long as there is a defect, it is determined as a defective product in all cases except that the testing results of both the black image and the white image are qualified. When the black image and the white image have their own defect categories, in this embodiment, two testing results (including the defect category information) are both marked for testing by the testers.

With respect to a magnetic circuit product whose testing result is a defective product, if there are multiple types of defects in the black image (or white image) of the magnetic circuit product, in this embodiment, the defects are arranged in the order from top to bottom and from left to right according to the coordinates of positions where the defects appear in the black image (or white image), and the first defect is taken as the representative defect category of this image, and either of the representative defect categories of the two images is selected as the defect category of the magnetic circuit product for subsequent classification and processing of defective magnetic circuit products.

Figure 6:
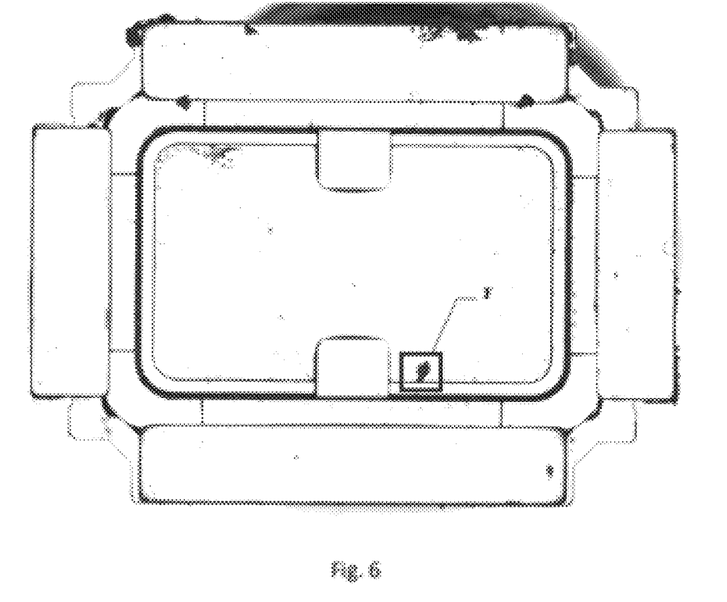
FIG. 6 is a schematic diagram of a type of defect included in a white image of a magnetic circuit product according to an embodiment of the present disclosure.

In this embodiment, a secondary judgment is performed on the product image whose testing result is a defective product to ensure the test accuracy. To perform the secondary judging, in this embodiment, the content of the testing result output by the neural network model is set so that each testing result simultaneously contains the defect category information and the coordinate information of the circumscribed rectangle where the defect appears in the original drawing (such as the coordinate information of the upper left corner and the lower right corner of the rectangle, a total of 2 pixels). FIG. 6 is a schematic diagram of a type of defect included in the white image of the magnetic circuit product according to an embodiment of the present disclosure. In FIG. 6, the rectangle indicated by reference mark F includes defective feature pixels. When the neural network model tests the defect shown in FIG. 6, it outputs the testing result which includes the coordinate values of the pixels in the upper left corner and the lower right corner of the rectangular frame F.

Figure 7:
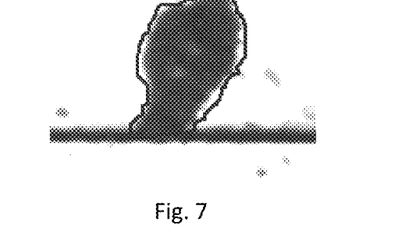
FIG. 7 is a schematic diagram of a contour determined according to defective feature pixels of the defect shown in FIG. 6.

Based on this, the contour of the rectangle is determined in this embodiment. FIG. 7 is a schematic diagram of the contour determined according to the defective feature pixels of the defects shown in FIG. 6. In this embodiment, as shown in FIG. 7, the defective feature pixels are determined according to the rectangular frame F shown in FIG. 6, and then curve fitting is performed according to the positions of the defective feature pixels to obtain the contour determined by the defective feature pixels, so as to facilitate the subsequent calculation of the area of contour.

In step S206, judging whether the area is greater than the threshold; if yes, maintaining the testing result of defective product; if no, amending it to a testing result of qualified product.

In this step, the contour area determined based on the number of pixels in the figure of the contour is compared with the preset threshold. If the contour area is greater than the area threshold, the testing result of defective product output by the neural network model is maintained. If the contour area is less than the area threshold, the testing result of the magnetic circuit product is corrected to a testing result of qualified product.

Step S207: obtaining a product quality testing result.

The result of the secondary judging in step S206 is taken as the product quality testing result. Till now, the quality testing result of the magnetic circuit product is obtained.

In addition, when magnetic circuit products are tested, different positions may have different requirements for defect testing, so it is necessary to consider the position of defective feature.

Step S208, performing region division on the image.

In this step, a target region and a non-target region are divided on each image of the magnetic circuit product according to the relationship between the position of the defective feature and the quality of the magnetic circuit product. The target region refers to the region in the image where occurrence of defective feature affects the product quality, and the non-target region refers to the region in the image where occurrence of defective feature does not affect the product quality.

Since the defect of wool/fiber on the magnetic circuit product can be clearly displayed on the black image, the black image and the defect category of wool/fiber are taken as an example to explain below. In other embodiments of the present disclosure, if the defect category of the product to be tested can be displayed more clearly on the white image, it is necessary to perform region division on the white image, and confirm whether it is a defective product according to the matching result between the defect position and the position of each region. The process is basically similar to the following black image processing and may refer to the following description: the magnetic circuit is divided into three regions: edge magnetic region, center magnetic region and magnetic gap, the regions are divided according to coordinates. The wool/fiber must be tested in the magnetic gap, so the magnetic gap is a target region. On the other hand, the wool/fiber on the edge magnetic region and the center magnetic region will not affect the performance of the product, so the wool/fiber on the edge magnetic region and the center magnetic region need not be tested, so the edge magnetic region and the center magnetic region are non-target regions.

Figure 8:
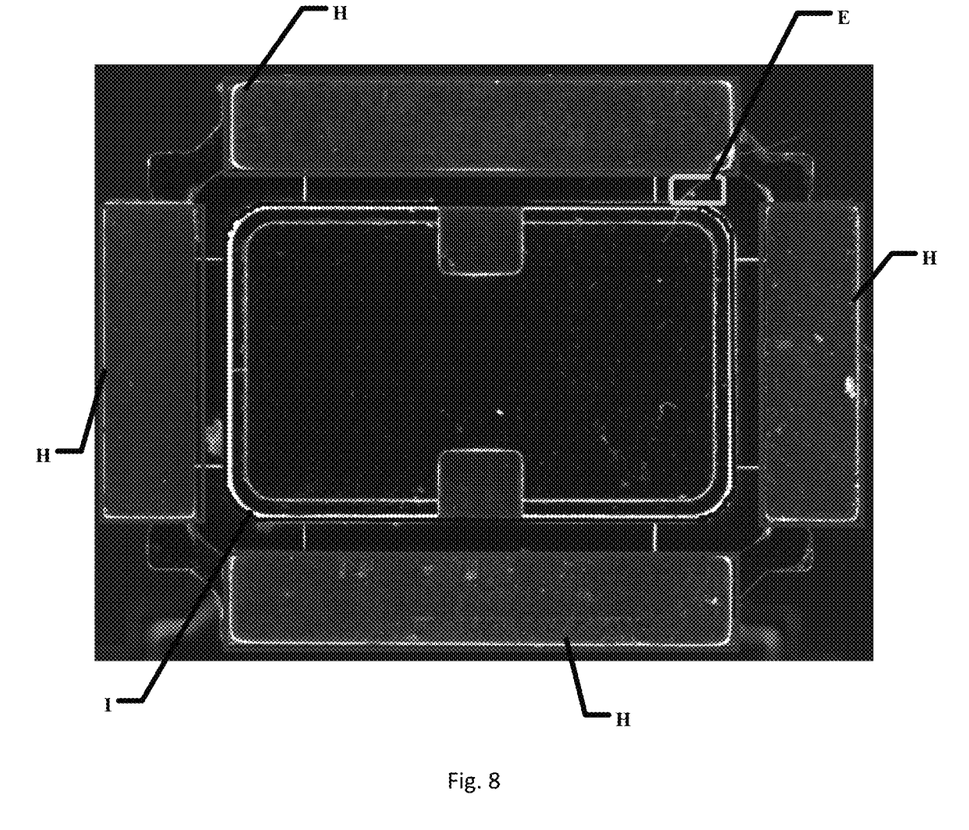
FIG. 8 is a schematic diagram of region division of a magnetic circuit product according to an embodiment of the present disclosure.

In other words, when the black image of the magnetic circuit product has a defective feature, the black image is divided to obtain the corresponding region division map. FIG. 8 is a schematic diagram of the region division of the magnetic circuit product according to an embodiment of the present disclosure. Referring to FIG. 8, the black image of the magnetic circuit product includes reference marks H, I and E. The reference mark H appears at the upper, lower, left and right positions of the black image, indicating the edge magnetism of the magnetic circuit product, that is, the magnetic circuit at the edges. The reference mark I appears at the center of the black image, indicating the central magnetic circuit of the magnetic circuit product. The reference numeral E appears at the upper right corner of the black image, and indicates the defective feature pixels of the wool/fiber defect included in the magnetic circuit product.

Step S209, judging whether the matching is successful; if yes, maintaining the testing result of defective product; if no, amending it to a testing result of qualified product.

Herein, according to the position information of the defective feature pixels in the testing result output by the neural network model in the image, the positions of the defective feature pixels in the image are matched with the target region and the non-target region respectively; when the positions of the defective feature pixels in the image are successfully matched with the target area, the testing result of defective product is maintained; when the positions of the defective feature pixels in the image are successfully matched with the non-target area, the product to be tested is determined as a qualified product.

Following the above example, it is calculated whether the coordinates of the defect position are within the magnetic circuit region where the wool/fiber need not be tested. If so, it is determined that the positions of the defective feature pixels in the image are successfully matched with the non-target region, and the testing result is amended to "a qualified product". That is, if the wool/fiber appears in the edge magnetic region and the central magnetic region that do not affect the product performance, it is determined that the matching is not successful.

In an embodiment of the present disclosure, as shown in FIG. 8, the wool/fiber (that is, the position indicated by the rectangular box E) appears in the target region, i.e., the magnetic gap. That is, the wool/fiber is a product defect, and the testing result of "a defective product" is maintained.

In addition, in this embodiment, a further determination may be performed according to the confidence corresponding to the defect category included in the testing result when the product to be tested is a defective product. For example, the confidence corresponding to the defect category (such as wool/fiber) recited in the testing result of the neural network model is 95%, and the preset defect threshold corresponding to the target region is 80%. If comparing the confidence corresponding to the defect category with the defect threshold, it can be seen that 95% is greater than 80%, that is, the confidence of defect category is greater than the preset defect threshold, so the testing result of "a defective product" shall be maintained.

Thus, by performing defective feature identification with respect to the black image and the white image of the same magnetic circuit product, respectively, the defective feature in the magnetic circuit product can be effectively identified, thereby avoiding missed test. By performing the secondary judgment, it can be avoided misjudging a qualified product as a defective product. It has been proved in practice that this embodiment has high test efficiency, can replace manual test, and has the advantages of low cost, high test efficiency, good accuracy and stability.

Figure 9:
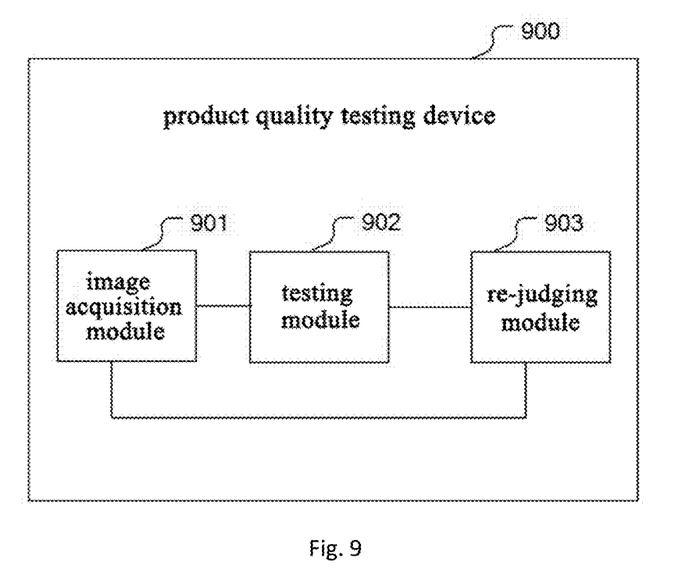
FIG. 9 is a block diagram of a device for testing product quality according to an embodiment of the present disclosure.

FIG. 9 is a block diagram of a product quality testing device according to an embodiment of the present disclosure. Referring to FIG. 9, the product quality testing device 900 of this embodiment comprises:

an image acquisition module 901 for acquiring an image of a product to be tested;
a testing module 902 for testing the image by using a pre-trained neural network model to obtain a testing result output by the neural network model; and
a re-judging module 903 for, when the testing result indicates that the product to be tested is a defective product, performing a re-judging on the testing result according to position information of defective feature pixels in the image in the testing result, and determining whether the product to be tested is qualified according to a re-judging result.

In an embodiment of the present disclosure, the re-judging module 903 is specifically for:

obtaining a contour of the defective feature pixels according to information of an effective region in the testing result, wherein the effective region is an image region including the defective feature pixels;
calculating an area value of the contour according to the pixels included in the figure of the contour, and maintaining the testing result of defective product when the area value is greater than a preset area threshold; and
when the area value is less than or equal to the preset area threshold, determining the product to be tested as a qualified product.

In an embodiment of the present disclosure, the re-judging module 903 is specifically for:

dividing the image into a target region and a non-target region according to a relationship between positions of defective features and product quality, wherein the target region refers to a region in the image where occurrence of defective feature affects the product quality, and the non-target region refers to a region in the image where occurrence of defective feature does not affect the product quality;
according to the position information of the defective feature pixels in the testing result in the image, matching positions of the defective feature pixels in the image with the target region and the non-target region respectively;
when the positions of the defective feature pixels in the image is successfully matched with the target region, maintaining the testing result of defective product; and
when the position of the defective feature pixels in the image is successfully matched with the non-target region, determining the product to be tested as a qualified product.

In an embodiment of the present disclosure, the testing result also includes the defect category information and confidence corresponding to the defect category when the product to be tested is a defective product. The re-judging module 903 is specifically for: setting a defect threshold corresponding to the target region; and comparing the confidence corresponding to the defect category with the defect threshold, and maintaining the testing result of defective product when the confidence of the defect category is greater than the preset defect threshold.

In an embodiment of the present disclosure, the image acquisition module 901 is specifically for acquiring a first image and a second image of the product to be tested under different exposure duration of the camera respectively, wherein the exposure duration corresponding to the first image is less than the exposure duration corresponding to the second image; and the testing module 902 is specifically for testing the first image and the second image respectively by using the pre-trained neural network model; and when at least one of the first image and the second image includes a defective feature, obtaining a testing result that the product to be tested is a defective product.

In an embodiment of the present disclosure, the testing module 902 is specifically for training the neural network model before testing the image using the pre-trained neural network model, specifically, acquiring a first image and a second image of the defective product, and marking an effective region where a defective feature is located on the first image and the second image of the defective product respectively, wherein at least part of defective features contained in the first image and the second image are different, and the effective region includes defective feature pixels; obtaining a first training sample according to the first image of the defective product, information of the effective region and defect category information corresponding to the defective feature, and training a first neural network model by using the first training sample to obtain a stable first neural network model; and obtaining a second training sample according to the second image of the defective product, information of the effective region and defect category information corresponding to the defective feature, and training a second neural network model by using the second training sample to obtain a stable second neural network model.

In an embodiment of the present disclosure, the testing module 902 is specifically for: using the first neural network model to test the first image of the product to be tested, when it is found that the first image of the product to be tested includes more than two defect categories, arranging the defect category in a preset order according to position information of each defect category appearing in the first image of the product to be tested, and determining a defect category as a representative defect category included in the first image according to an arrangement result; using the second neural network model to test the second image of the product to be tested, when it is found that the second image of the product to be tested includes more than two defect categories, arranging the defect category in a preset order according to position information of each defect category appearing in the second image of the product to be tested, and determining a defect category as a representative defect category included in the second image according to an arrangement result; taking the representative defect category included in the first image or the representative defect category included in the second image as the defect category of the product to be tested, so as to classify the product to be tested according to the defect category of the product to be tested.

In an embodiment of the present disclosure, the product to be tested is a magnetic circuit product, and the image acquisition module 901 is specifically for obtaining black image and white image of the magnetic circuit product. The testing module 902 is specifically for: testing the black image by using the pre-trained neural network model, and obtaining a testing result output by the neural network model that the black image includes at least one of the following defect categories: impurities, wool/fiber, crush and breakage; and testing the white image by using the pre-trained neural network model, and obtaining a testing result output by the neural network model that the white image includes at least one of the following defect categories: impurities, wool/fiber, crush, breakage and glue overflow.

Figure 10:
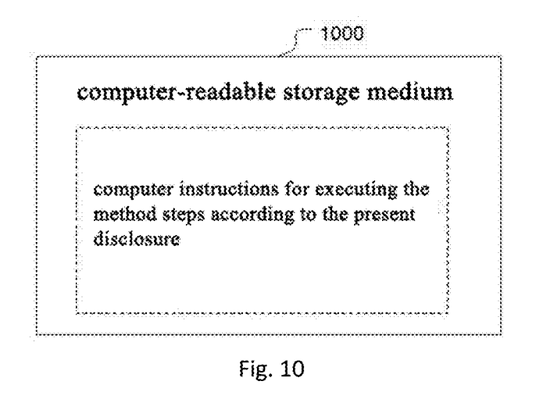
FIG. 10 is a schematic diagram of the structure of a computer readable storage medium according to an embodiment of the present disclosure.

Referring to FIG. 10, yet another embodiment of the present disclosure provides a computer-readable storage medium 1000 storing computer instructions that cause a computer to execute the above method.

Specifically, the computer instructions stored in the computer-readable storage medium 1000 cause the computer to perform the following processing:
  acquiring an image of a product to be tested;
  testing the image by using a pre-trained neural network model to obtain a testing result output by the neural network model; and
  when the testing result indicates that the product to be tested is a defective product, performing a secondary judgment on the testing result according to position information of defective feature pixels in the image in the testing result, and determining whether the product to be tested is qualified according to a secondary judgment result.

The computer instructions further cause the computer to perform the following processing:
  obtaining a contour of the defective feature pixels according to information of an effective region in the testing result, wherein the effective region is an image region including the defective feature pixels;
  calculating an area value of the contour according to the pixels included in the figure of the contour, and maintaining the testing result of defective product when the area value is greater than a preset area threshold; and
  when the area value is less than or equal to the preset area threshold, determining the product to be tested as a qualified product.

The computer instructions further cause the computer to perform the following processing:
  dividing the image into a target region and a non-target region according to a relationship between positions of defective features and product quality, wherein the target region refers to a region in the image where occurrence of defective feature affects the product quality, and the non-target region refers to a region in the image where occurrence of defective feature does not affect the product quality;
  according to the position information of the defective feature pixels in the testing result in the image, matching positions of the defective feature pixels in the image with the target region and the non-target region respectively;
  when the positions of the defective feature pixels in the image is successfully matched with the target region, maintaining the testing result of defective product; and
  when the position of the defective feature pixels in the image is successfully matched with the non-target region, determining the product to be tested as a qualified product.

The computer instructions further cause the computer to perform the following processing:
  acquiring a first image and a second image of the product to be tested under different exposure duration of the camera respectively, wherein the exposure duration corresponding to the first image is less than the exposure duration corresponding to the second image;
  testing the first image and the second image respectively by using the pre-trained neural network model; and
  when at least one of the first image and the second image includes a defective feature, obtaining a testing result that the product to be tested is a defective product.

The computer instructions further cause the computer to perform the following processing:
  acquiring a first image and a second image of the defective product, and marking an effective region where a defective feature is located on the first image and the second image of the defective product respectively, wherein at least part of defective features contained in the first image and the second image are different, and the effective region includes defective feature pixels;
  obtaining a first training sample according to the first image of the defective product, information of the effective region and defect category information corresponding to the defective feature, and training a first neural network model by using the first training sample to obtain a stable first neural network model; and
  obtaining a second training sample according to the second image of the defective product, information of the effective region and defect category information corresponding to the defective feature, and training a second neural network model by using the second training sample to obtain a stable second neural network model.

It should be noted that the specific implementation mode of each module in the above device embodiments and the specific processing performed by the program codes in the above computer-readable storage medium embodiments can be carried out with reference to the specific content of the above corresponding method embodiments, and will not be repeated here.

As will be appreciated by a person skilled in the art, the embodiments of the present disclosure may be embodied as a system, method or computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to magnetic storage media, CD-ROMs, optical storage media, etc.) having computer-usable program codes recorded thereon.

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be noted that the terms, "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for testing product quality, comprising:
   acquiring an image of a product to be tested;
   testing the image by using a pre-trained neural network model to obtain a testing result output by the neural network model; and
   when the testing result indicates that the product to be tested is a defective product, performing a secondary judgment on the testing result according to position information of defective feature pixels in the image in the testing result, and determining whether the product to be tested is qualified according to a secondary judgment result,
   wherein performing a secondary judgment on the testing result according to position information of defective feature pixels in the image in the testing result comprises:
   obtaining a contour of the defective feature pixels according to information of an effective region in the testing result, wherein the effective region is an image region including the defective feature pixels;
   calculating an area value of the contour according to the pixels included in the figure of the contour, and maintaining the testing result of defective product when the area value is greater than a preset area threshold; and
   when the area value is less than or equal to the preset area threshold, determining the product to be tested as a qualified product.

2. The method according to claim 1, wherein performing the secondary judgment on the testing result according to position information of defective feature pixels in the image in the testing result comprises:
   dividing the image into a target region and a non-target region according to a relationship between positions of defective features and product quality, wherein the target region refers to a region in the image where occurrence of defective feature affects the product quality, and the non-target region refers to a region in the image where occurrence of defective feature does not affect the product quality;
   according to the position information of the defective feature pixels in the image in the testing result, matching positions of the defective feature pixels in the image with the target region and the non-target region respectively;
   when the positions of the defective feature pixels in the image are successfully matched with the target region, maintaining the testing result of defective product; and
   when the positions of the defective feature pixels in the image are successfully matched with the non-target region, judging the product to be tested as a qualified product.

3. The method according to claim 2, wherein
   the testing result further includes defect category information and confidence corresponding to a defect category when the product to be tested is a defective product;
   performing the secondary judgment on the testing result according to position information of defective feature pixels in the image in the testing result comprises:
   setting a defect threshold corresponding to the target region; and
   comparing the confidence corresponding to the defect category with the defect threshold, and maintaining the testing result of defective product when the confidence of the defect category is greater than the preset defect threshold.

4. The method according to claim 1, wherein
   acquiring the image of the product to be tested comprises:
   acquiring a first image and a second image of the product to be tested under different exposure duration of a camera respectively, wherein the exposure duration corresponding to the first image is less than the exposure duration corresponding to the second image;
   testing the image by using a pre-trained neural network model to obtain a testing result output by the neural network model comprises:
   testing the first image and the second image respectively by using the pre-trained neural network model; and
   when at least one of the first image and the second image includes a defective feature, obtaining a testing result that the product to be tested is a defective product.

5. The method according to claim 1, further comprising:
   training the neural network model before testing the image using the pre-trained neural network model, specifically comprising:
   acquiring a first image and a second image of a defective product, and marking an effective region where a defective feature is located on the first image and the second image of the defective product respectively, wherein at least part of defective features contained in the first image and the second image are different, and the effective region includes defective feature pixels;
   obtaining a first training sample according to the first image of the defective product, information of the effective region and defect category information corresponding to the defective feature, and training a first neural network model by using the first training sample to obtain a stable first neural network model; and obtaining a second training sample according to the second image of the defective product, information of the effective region and defect category information corresponding to the defective feature, and training a second neural network model by using the second training sample to obtain a stable second neural network model.

6. The method according to claim 5, wherein testing the first image and the second image respectively by using the pre-trained neural network model comprises:

using the first neural network model to test the first image of the product to be tested, when it is found that the first image of the product to be tested includes more than two defect categories, arranging the defect category in a preset order according to position information of each defect category appearing in the first image of the product to be tested, and determining a defect category as a representative defect category included in the first image according to an arrangement result;

using the second neural network model to test the second image of the product to be tested, when it is found that the second image of the product to be tested includes more than two defect categories, arranging the defect category in a preset order according to position information of each defect category appearing in the second image of the product to be tested, and determining a defect category as a representative defect category included in the second image according to an arrangement result; and taking the representative defect category included in the first image or the representative defect category included in the second image as a defect category of the product to be tested, so as to classify the product to be tested according to the defect category of the product to be tested.

7. The method according to claim 1, wherein the product to be tested is a magnetic circuit product;

acquiring the image of the product to be tested comprises:

obtaining a black image and a white image of the magnetic circuit product;

testing the image by using a pre-trained neural network model to obtain a testing result output by the neural network model comprises:

testing the black image by using the pre-trained neural network model, and obtaining a testing result output by the neural network model that the black image includes at least one of the following defect categories: impurities, wool/fiber, crush and breakage; and testing the white image by using the pre-trained neural network model, and obtaining a testing result output by the neural network model that the white image includes at least one of the following defect categories: impurities, wool/fiber, crush, breakage and glue overflow.

* * * * *